(12) United States Patent
Mott

(10) Patent No.: US 6,241,078 B1
(45) Date of Patent: Jun. 5, 2001

(54) CONVEYOR BELT TRAINER

(75) Inventor: George T. Mott, Alburtis, PA (US)

(73) Assignee: ASGCO Manufacturing, Inc., Allentown, PA (US)

( * ) Notice: Subject to any disclaimer, the term of this patent is extended or adjusted under 35 U.S.C. 154(b) by 0 days.

(21) Appl. No.: 09/527,312

(22) Filed: Mar. 16, 2000

Related U.S. Application Data

(63) Continuation of application No. PCT/US99/21380, filed on Sep. 17, 1999.
(60) Provisional application No. 60/101,055, filed on Sep. 18, 1998.

(51) Int. Cl.[7] .................................................. B65G 39/16
(52) U.S. Cl. ........................................... 198/806; 198/808
(58) Field of Search ...................................... 198/806–808

(56) References Cited

U.S. PATENT DOCUMENTS

| | | | |
|---|---|---|---|
| 1,833,180 | * 11/1931 | Robins | 198/806 |
| 2,305,036 | * 12/1942 | Salfisberg | 198/806 |
| 2,399,913 | * 5/1946 | Dodge | 198/806 |
| 2,655,251 | 10/1953 | Bankauf . | |
| 3,993,186 | * 11/1976 | Sokolowski | 198/806 |
| 4,196,803 | 4/1980 | Lovett . | |
| 5,467,171 | 11/1995 | Castelli . | |
| 5,911,304 | 6/1999 | Cumberlege . | |

FOREIGN PATENT DOCUMENTS

| 1462465 | * 12/1966 | (FR) | 198/808 |
|---|---|---|---|

* cited by examiner

Primary Examiner—Christopher P. Ellis
Assistant Examiner—Mark A. Deuble
(74) Attorney, Agent, or Firm—Dann, Dorfman, Herrell and Skillman; Stephen H. Eland

(57) ABSTRACT

An apparatus and method for training a troughing conveyor belt are provided. The apparatus includes a training roller enclosing a concentric shaft. The training roller is rotatably connected to the shaft. In addition, the training roller is pivotable relative to the shaft about a pivot axis that is transverse the longitudinal axis of the shaft. The training roller engages the conveyor belt so that the conveyor belt rotates the training roller. When the conveyor belt is properly aligned, the force of the belt against the training roller is equally distributed on both sides of the pivot axis of the training roller. When the belt becomes misaligned, the training roller pivots in response to the unequal force of the conveyor belt on opposite sides of the pivot axis. The belt then travels down the pivoted roller, thereby realigning the belt. The shaft is rotatable between two positions. Rotating the shaft also rotates the pivot axis of the training roller. A pair of friction rings frictionally couples the training roller with the shaft so that reversing the direction of the conveyor belt that is in contact with the training roller rotates the shaft between the first and second positions, thereby rotating the pivot axis. Accordingly, reversing the direction of the conveyor belt rotates the pivot axis of the device so that the device continues to train the conveyor belt while the belt travels in the reverse direction.

26 Claims, 7 Drawing Sheets

CONVEYOR BELT TRAINER

This application is a continuation of PCT/US99/21380 filed Sep. 17, 1999, which claims benefit of 60/101,055 filed Sep. 18, 1998.

FIELD OF THE INVENTION

The present invention relates to the field of conveyor belts for conveying materials. Specifically, the present invention relates to an alignment mechanism for aligning a conveyor belt that is operable in a forward direction and a reverse direction.

BACKGROUND OF THE INVENTION

Endless belt conveyors made from a fabric carcass such as nylon, polyester, kevlar, fiberglass, steel, monofilament etc. and covered with a rubber compound and/or urethane PVC from 1/16" to over 1" thick are used to convey many types of raw and processed materials in many environmental conditions. As a result, many factors such as temperature, moisture, loading characteristics, design characteristics and wind forces cause problems keeping the conveyor belt aligned on both the troughing (carrying side) and the return side of the belt. The misalignment of the belt causes damage to the belt, damage to the structure carrying the belt, and spillage problems.

Typically, the training rollers utilized to monitor and return the belt to proper alignment have been mounted below the belt where the residue adhering to the carrying surface of the belt can transfer to the training roller causing inaccurate alignment. Additionally, the only force acting directly on the trainer is the weight of the conveyor belt. Typically other types of training idlers are pivoted from a center gudgeon and have guide rollers mounted several inches from the edge of the belt so that the belt has to move considerably out of alignment to cause actuation of the training idler or the pivot was mounted for universal angular movement and contact with a braking mechanism caused the idler to be displaced in a direction to restore the belt to alignment. The center gudgeon builds up with material from the dirty side of the belt causing it to "freeze" in place or just "jam" itself from working properly.

SUMMARY OF THE INVENTION

In light of the foregoing, the present invention provides an apparatus and method for aligning a conveyor belt. The apparatus pivots about a pivot axis in response to the imbalance caused by misalignment of the conveyor belt. The pivoting of the trainer causes the conveyor belt to move towards the proper alignment. When the direction of the conveyor belt is reversed, the pivot axis of the training apparatus is rotated so that the training device aligns the conveyor belt while the conveyor belt is traveling in the reverse direction.

The apparatus includes an inner shaft having a longitudinal axis, the inner shaft being rotatable about the longitudinal axis between a first and second position. A training roller circumscribes the shaft and is in operable engagement with a conveyor belt. The roller is pivotable about an axis transverse the longitudinal axis of the shaft. A driving mechanism engages the shaft and the roller and is operable to rotate the shaft from the first position to the second position in response to the conveyor belt changing directions from the forward direction to the reverse direction.

The invention also provides a method for aligning a conveyor belt operable in a forward direction and a reverse direction. The method includes the steps of conveying a conveyor belt in a forward direction along a conveyor path. Material is deposited onto the conveyor belt. The conveyor belt is aligned along the conveyor path as the conveyor belt travels in the forward direction. The deposited material is discharged from the conveyor belt. The direction of the conveyor belt is reversed so that the conveyor belt travels in a reverse direction. After the direction of the conveyor belt is reversed, the conveyor belt is aligned as the conveyor belt travels in the reverse direction. In addition, preferably, the method includes the step of providing a training device for aligning the conveyor belt, wherein the training device is pivotable about a pivot axis and reversing the conveyor belt from the forward direction to the reverse direction rotates the pivot axis.

BRIEF DESCRIPTION OF THE DRAWINGS

The foregoing summary, as well as the following detailed description of the preferred embodiments of the present invention, will be better understood when read in conjunction with the appended drawings, in which.

DETAILED DESCRIPTION OF THE PREFERRED EMBODIMENT

Figure 1:
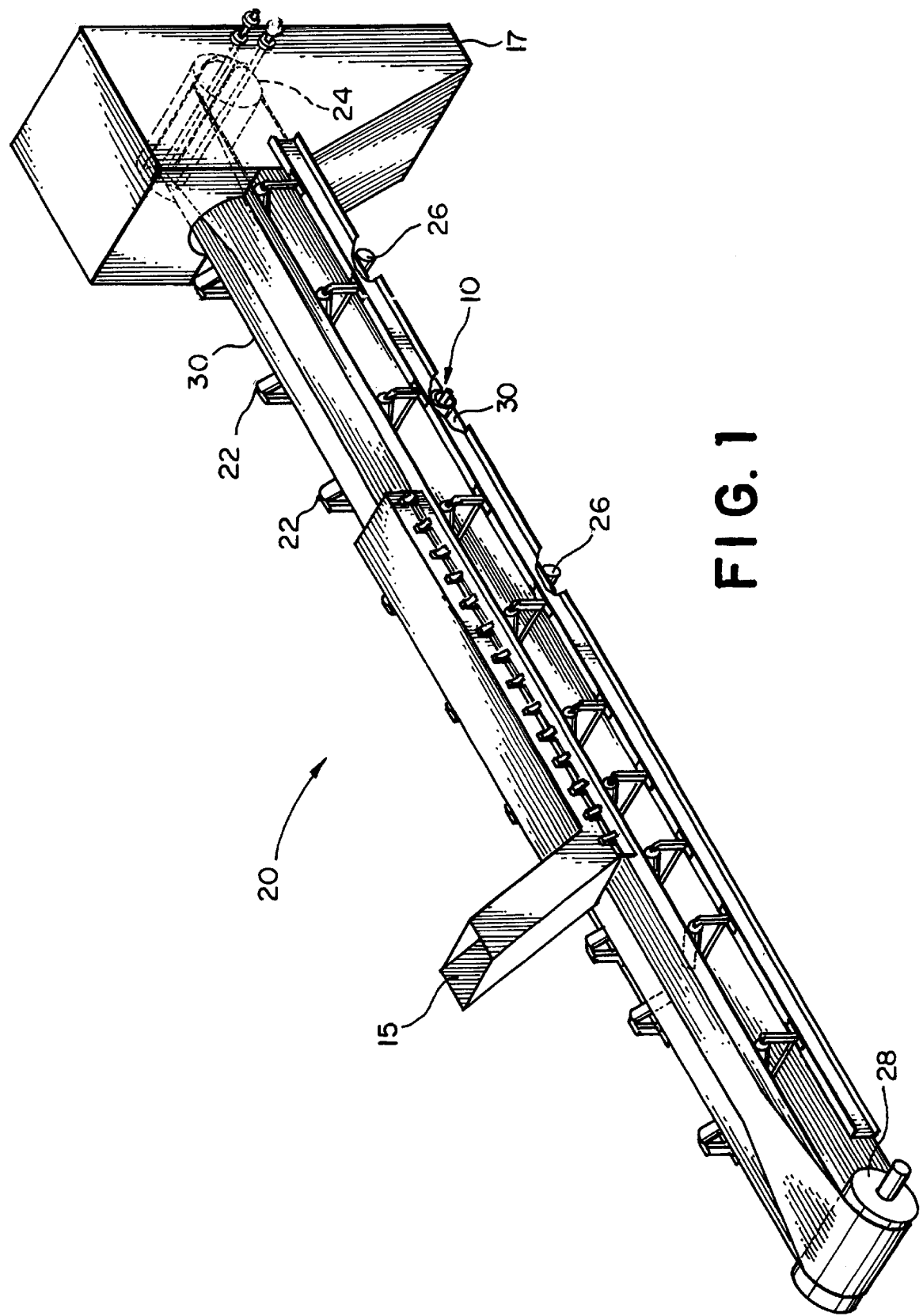
FIG. 1 is perspective view of a conveyor system according to the present invention.
Figure 2:
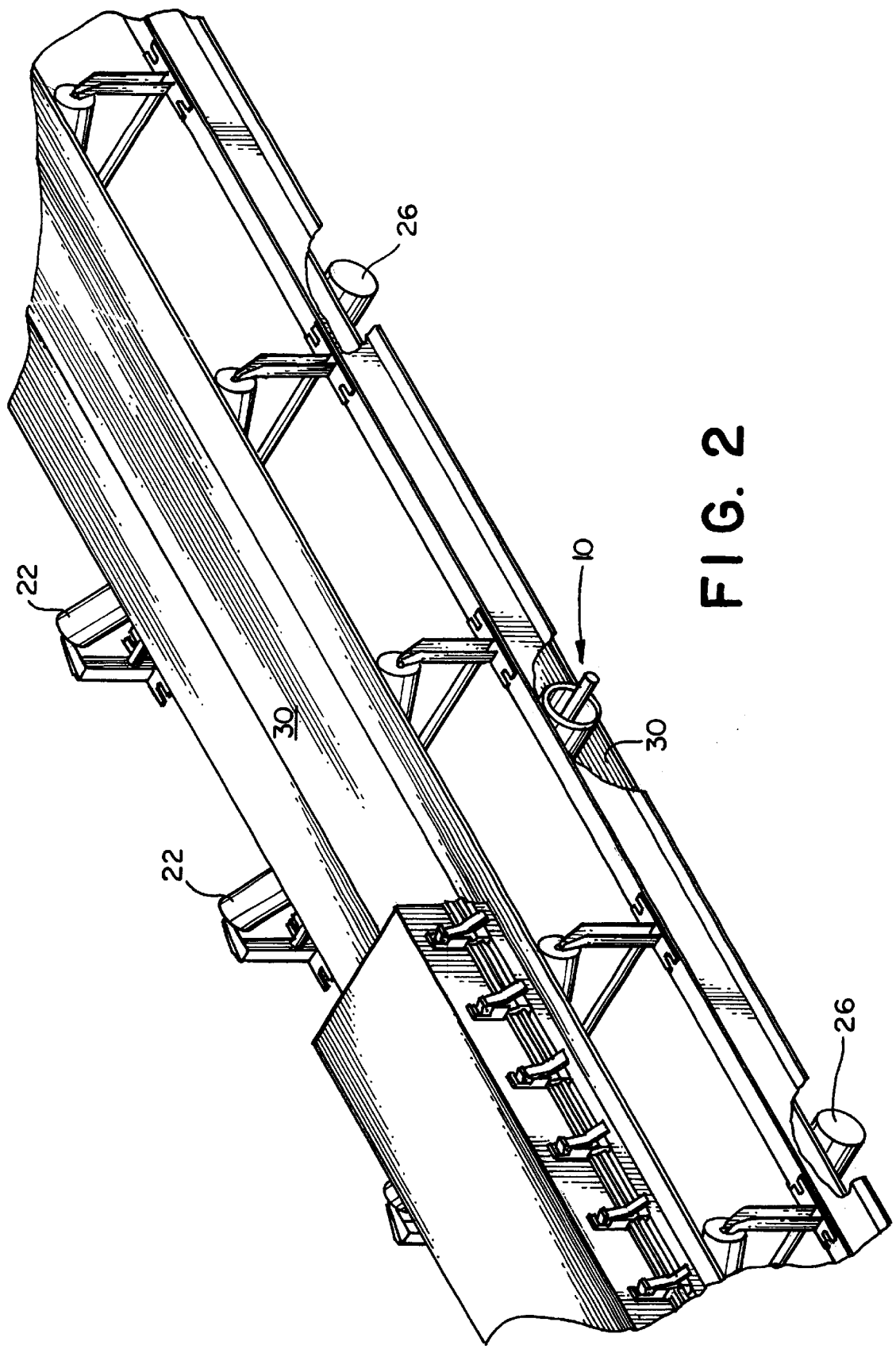
FIG. 2 is an enlarged fragmentary view of the conveyor system illustrated in FIG. 1.

Referring now to the drawings in general and to FIGS. 1 and 2 specifically, a conveyor belt trainer 10 for maintaining the alignment of a troughing conveyor belt 30 is shown. The conveyor belt trainer 10 is positioned transverse to the direction of the conveyor belt motion. The conveyor belt trainer 10 is comprised of a hollow, cylindrical training roller 40 that engages the conveyor belt 30, a generally coaxially shaft 60, and a bearing assembly 110 that permits the training roller to rotate and pivot independently of the shaft 60. When the conveyor belt is properly tracked, the conveyor belt is balanced about the bearing assembly 110. As the conveyor belt 30 runs off-track the roller 40 pivots to compensate for the imbalance, thereby realigning the conveyor belt 30. When the direction of the conveyor belt motion is reversed, the conveyor belt trainer 10 rotates the pivot axis of the training roller so that the trainer 10 maintains the alignment of the conveyor belt 30 when the belt is traveling in the reverse direction.

As shown in FIG. 1, a troughing conveyor system 20 for carrying material is shown. Material is deposited from a chute 15 onto an endless conveyor belt 30. The conveyor conveys the material to a discharge 17 where the material is discharged. The endless conveyor belt 30 has an upper run carried on troughing rollers 22 and a lower run carried on return rollers 26. The conveyor belt 30 is trained about a head pulley 24 and a tail pulley 28 at each end of the conveyor system 20.

Material is conveyed on the outer surface or carrying surface of the upper run of the conveyor belt 30. Residual material on the carrying surface of the conveyor belt can impede the proper operation of the trainer 10 and can increase the wear on the trainer 10. Therefore, preferably, the trainer 10 engages the inner surface of the conveyor belt that engages the troughing rollers 22, so that the inner surface is remote from the conveyed material and is substantially free of residual material. Accordingly, on the lower run of the conveyor system 20, the conveyor belt 30 passes over the return rollers 26 and under the conveyor belt trainer 10. Thus, when the belt travels on the lower run of the conveyor assembly, the return rollers 26 are in contact with the carrying surface of the conveyor belt 30 and the conveyor belt trainer 10 is in contact with the clean side of the conveyor belt 30. This prevents debris from the carrying surface of the conveyor belt 30 from building up on the conveyor belt trainer 10. In addition, since the conveyor belt 30 passes over the rollers 26 and under the trainer 10, the belt is tensioned into engagement with the trainer.

Figure 3:
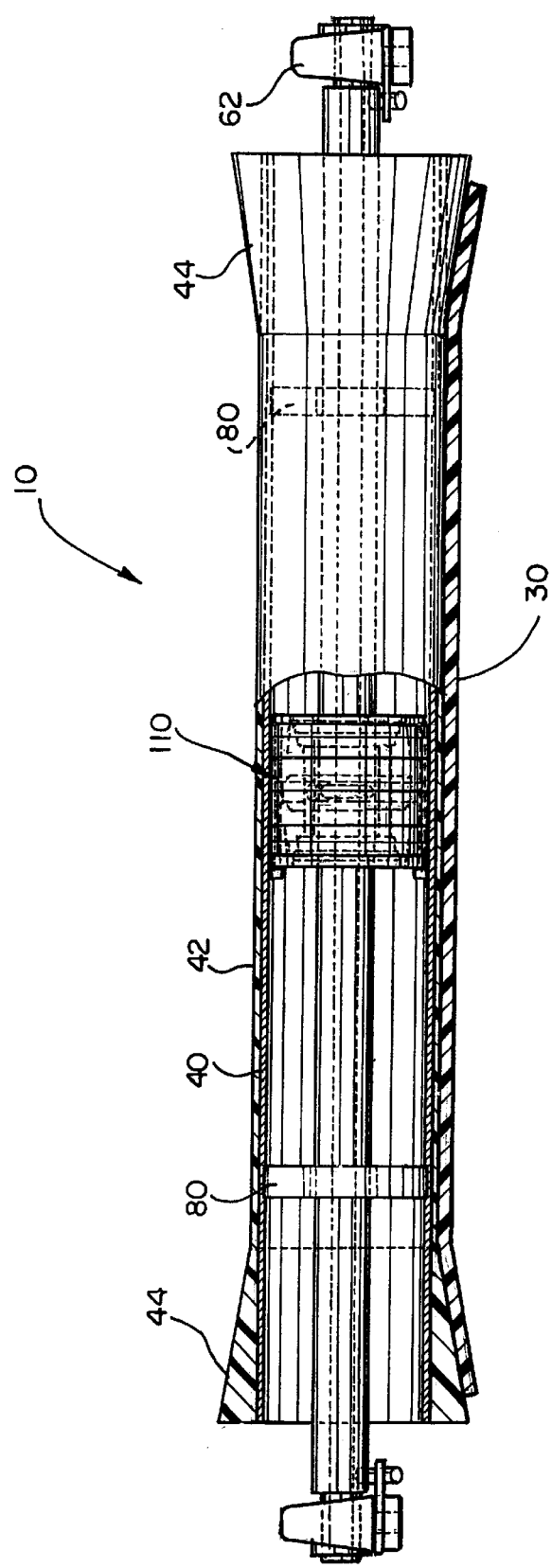
FIG. 3 is a side view partially broken away of a conveyor belt training device of the conveyor belt system illustrated in FIG. 1.
Figure 4:
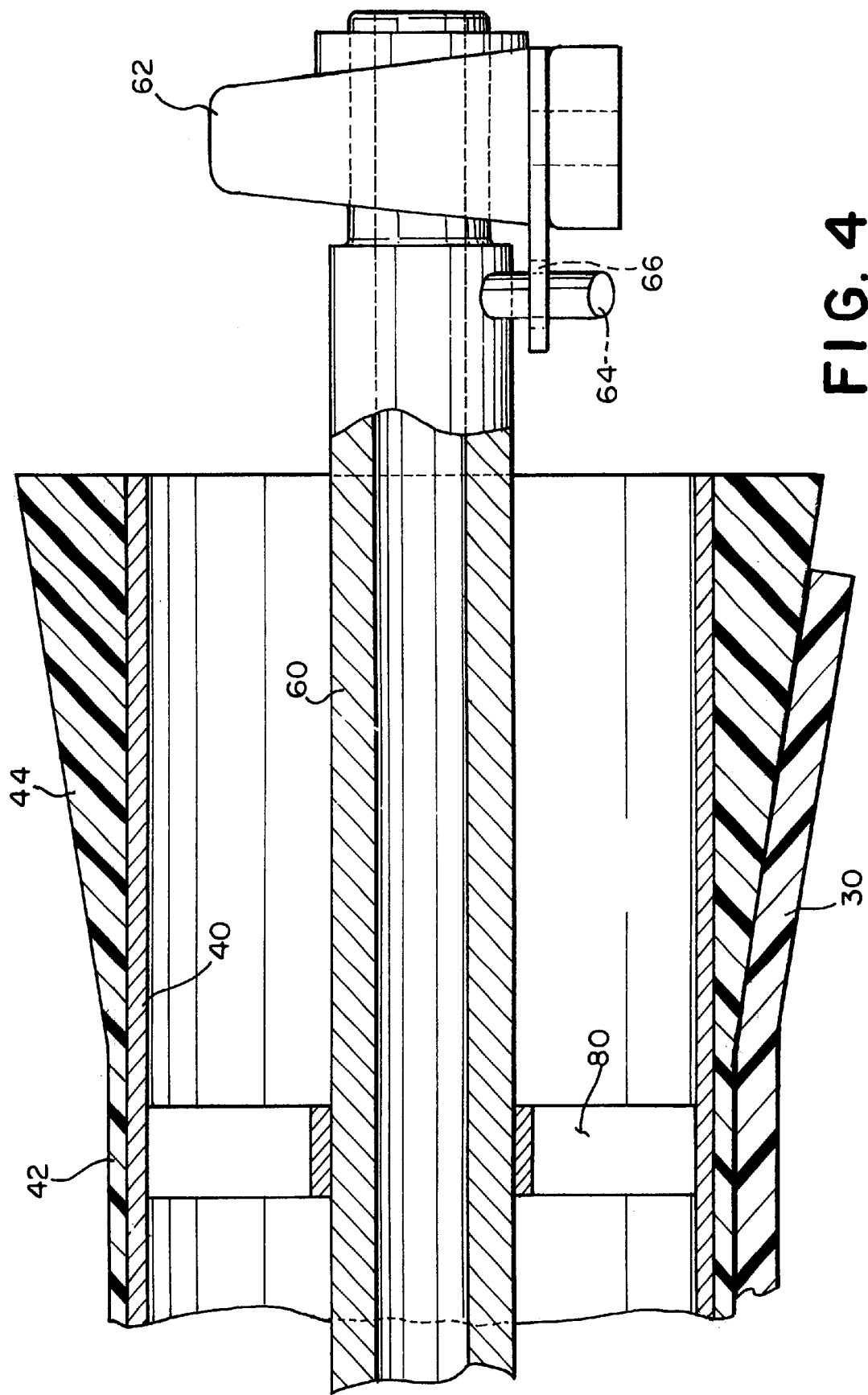
FIG. 4 is an enlarged fragmentary sectional view of the conveyor belt training device illustrated in FIG. 3.

Referring to FIGS. 3 and 4, the conveyor belt trainer 10 includes the training roller 40 and the concentric shaft 60 within the training roller. The training roller 40 is in operable contact with the conveyor belt 30 and is positioned transverse to the direction that the conveyor belt travels. The roller is at least substantially the width of the conveyor belt. In addition, preferably, the roller 40 includes a gripping layer 42 on the outer surface of the roller to increase the frictional engagement between the roller and the conveyor belt 30. In the present instance, the gripping layer 42 is formed of a high-friction elastomeric material.

The troughing rollers 22 (shown in FIG. 2) may tend to curve the edges of the belt outwardly so that on the lower run the edges of the belt may tend to curve outwardly causing the edges of the belt to bow away from the trainer 10. Therefore, preferably the ends of the gripping layer 42 flare outwardly forming frustoconical portions 44 at the ends of the roller 40. The frustoconical end sections 44 increase the frictional engagement between the edges of the conveyor belt 30 and the trainer, thereby increasing the sensitivity of the conveyor belt trainer 10 to changes in alignment. The frustoconical end sections may be made thicker or longer to accommodate various degrees of training and bolt widths.

As shown in FIGS. 3 and 4, the training roller 40 is pivotally and rotatably connected to the shaft 60. The roller 40 is pivotal relative to the shaft about an axis transverse the longitudinal axis of the shaft, as is discussed further below.

Figure 5:
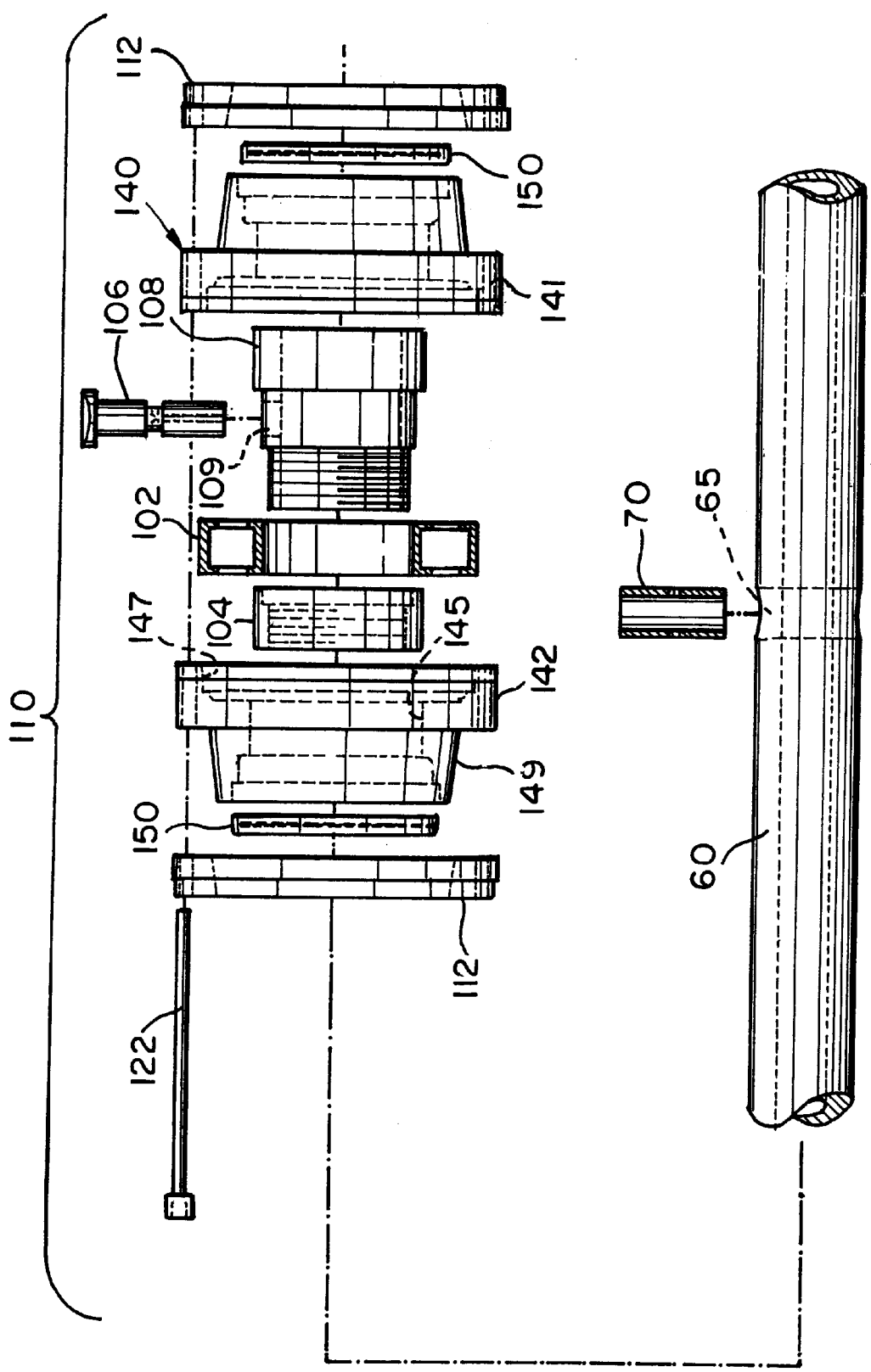
FIG. 5A is an enlarged exploded fragmentary side view of the conveyor belt training device illustrated in FIG. 3.

Referring now to FIGS. 3 and 5, the bearing assembly 110 is disposed between the shaft 60 and the training roller 40, so that the roller rotates freely relative to the shaft. The bearing assembly 110 pivots about a pivot pin 106 that projects into a hole 65 in the shaft 60. The training roller 40 is connected to the bearing assembly 110, so that the roller pivots with the bearing assembly about the pivot pin 106. In this way, the roller 40 is pivotable relative to the shaft 60 about a pivot axis that is transverse the roller's axis of rotation and the shaft's longitudinal axis.

The bearing assembly 110 includes an outer casing 140 that encloses a sleeve 108 and a ring bearing 102 disposed between the casing and the sleeve. The sleeve 108 is a hollow generally cylindrical sleeve having an externally threaded end. A hole 109 for receiving the pivot pin 106 extends through the sleeve transverse the longitudinal axis of the sleeve. A corresponding hole 65 extends through the shaft 60 transverse the elongated longitudinal axis of the shaft. The sleeve 108 is coaxially mounted on the shaft so that the hole 109 in the sleeve aligns with the hole 65 in the shaft. The pivot pin 106 is inserted into the aligned holes so that the pivot pin extends through the sleeve and the shaft. Preferably, a bushing 70 is disposed in the hole 65 in the shaft, and the pivot pin is inserted into the bushing. In this way, the pivot pin 106 connects the sleeve 108 and the shaft so that the sleeve and the shaft rotate together circumferentially, and the sleeve pivots laterally relative to the shaft about a pivot axis defined by the pivot pin.

The sleeve 108 includes an enlarged diameter head portion on the end of the sleeve opposite the threaded end. The edge of the enlarged head portion forms a shoulder against which the ring bearing 102 abuts. The ring bearing 102 is mounted on the sleeve 108, against the enlarged head of the sleeve so that the inner race of the ring bearing engages the sleeve. A retention nut 104 threadedly engages the externally threaded portion of the sleeve 108 to retain the ring bearing on the sleeve abutting the shoulder.

The outer casing 140 encloses the ring bearing 102 and the sleeve 108. The casing has a right half 141 and a left half 142 that are substantially similar. The casing has a bore 145 for receiving the sleeve 108 and the shaft 60. Additionally, the casing 140 has an internal annular recess 147 for receiving the ring bearing 102. The recess is sized so that the outer race of the ring bearing 102 engages the casing. In this way, the ring bearing 102 allows the casing to rotate freely relative to the sleeve 108 and the shaft 60.

A pair of expansion rings 112 fix the casing to the internal surface of the training roller 40. The outer surface of each half of the casing has a frustoconical portion 149 that cooperates with one of the expansion rings. Each expansion ring 112 has a tapered internal surface that cooperates with the external surface of frustoconical portion 149 of the casing. The expansion rings 112 have a plurality of longitudinally elongated slits that allow the expansion rings to deform radially.

A plurality of tie bolts 122 extend through the expansion rings 112 and the right and left halves 141, 142 of the casing to connect the halves of the casing. Tightening the tie bolts also forces the expansion rings 112 onto the tapered external surfaces of the frustoconical portions 149 of the casing. The wedging action of the internal and external tapered surfaces deforms the expansion rings radially outwardly so that the expansion rings frictionally engage the outer sleeve. The casing preferably also includes a pair of end caps 150 that generally close the bore 145 of the casing to prevent debris from entering the casing.

Referring now to FIGS. 6A, 6B, 7A and 7B, the ends of the shaft 60 are journalled in pillow block bearings 62. A stop pin 64 connected to each end of the shaft 60 restricts the range of rotation of the shaft. Preferably, the stop pin 64 limits the rotation of the shaft to a range of 90 degrees within the pillow block bearing 62. The stop pins 64 are connected to the ends of the shaft 60 so that the pins project radially outwardly from the shaft. Each stop pin 64 cooperates with an elongated slot 68 in a plate 66 adjacent the pillow black bearings 62. Each stop pin projects into one of the slots 68 and the stop pins are free to travel between the ends of the slots. In this way, the ends of the slots act as stops limiting the travel of the stop pins 64, which in turn limits the pivotal motion of the shaft 60.

Figure 6A:
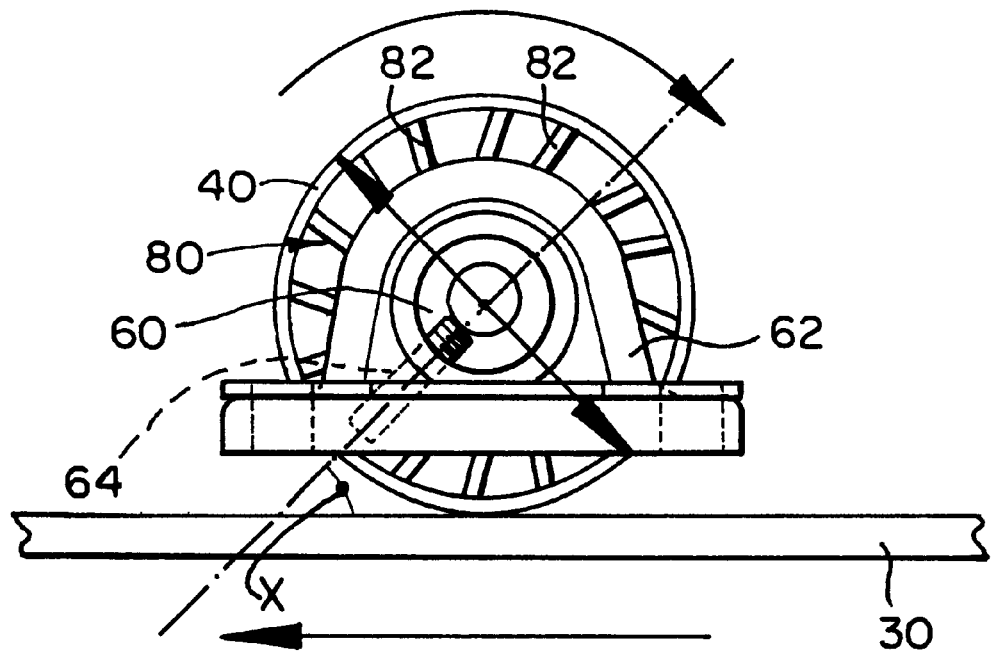
FIG. 6A is an end view of the conveyor belt training device illustrated in FIG. 3.
Figure 6B:
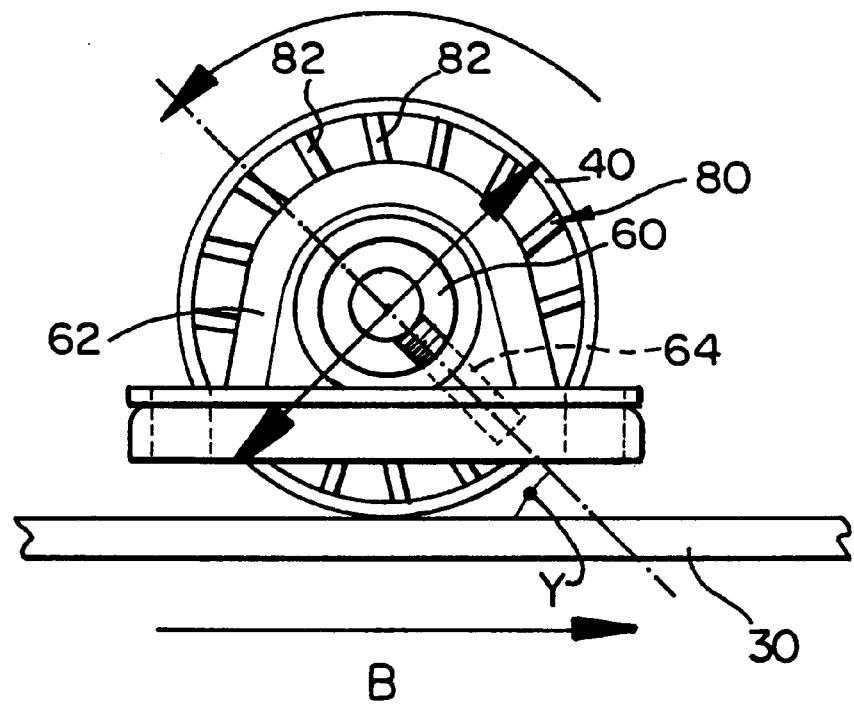
FIG. 6B is an end view of the conveyor belt training device illustrated in FIG. 6A, illustrating the device rotated ninety degrees.
Figure 7A:
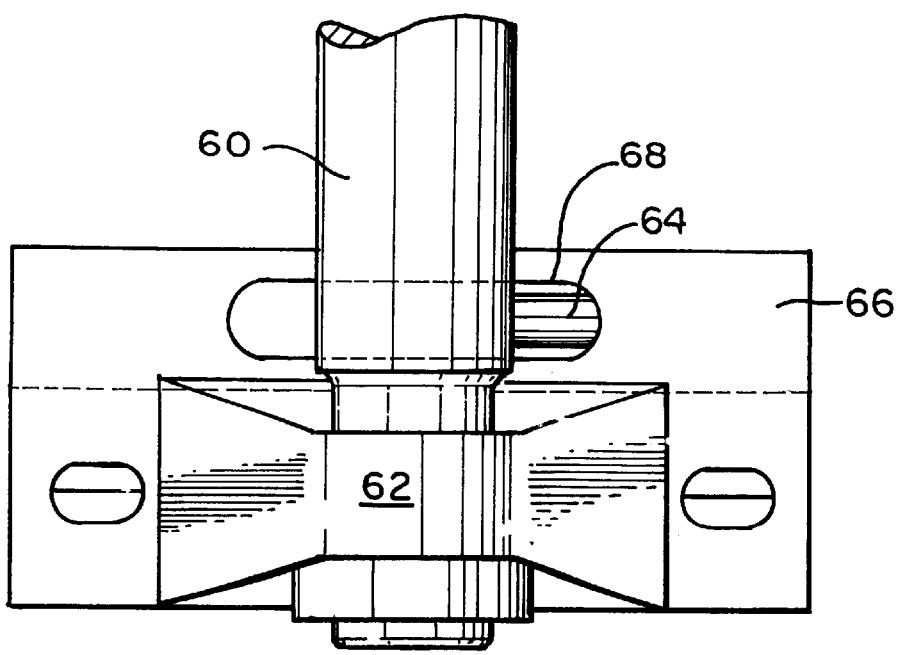
FIG. 7A is a fragmentary plan view of the conveyor belt training device illustrated in FIG. 3.
Figure 7B:
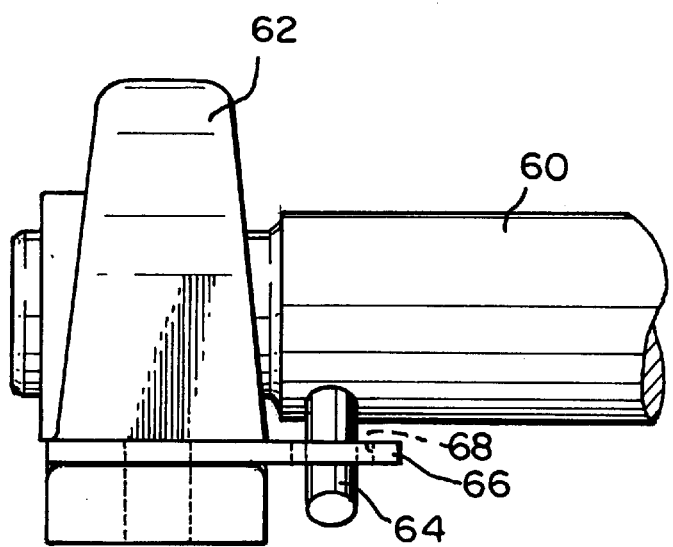
FIG. 7B is a fragmentary side elevational view of the conveyor belt training device illustrated in FIG. 7A.

For example, referring to FIG. 6A, the forward direction of movement for the conveyor belt 30 is indicated by arrow A. In this instance, the pivot axis is parallel to the longitudinal axis of stop pin 64 so that the pivot axis forms angle X with the direction of movement. When the direction of movement of the belt is reversed, as indicated by arrow B in FIG. 6B, the pivot axis is rotated so that the pivot axis forms angle Y with the direction of movement of the conveyor belt. Accordingly, when the direction of the conveyor belt is reversed, the pivot axis of the conveyor belt trainer 10 rotates beyond a line normal to the conveyor belt 30. For instance, angle X is preferable 45°. When the conveyor belt is reversed, preferably the pivot axis is rotated 90 degrees so that angle Y is 45° as shown in FIG. 6B. Similarly, if angle X is 30°, then when the conveyor is reversed, the pivot axis is rotated 60° so that angle Y is 30°.

Referring now to FIGS. 3–4, 6A and 6B, a pair of elastomeric friction rings 80 are in operable contact with both the training roller 40 and the shaft 60. The friction rings 80 are round, having a central bore and a plurality of resilient fingers extending radially from the central bore, circumferentially spaced apart from one another. The friction rings 80 are mounted on the shaft 60 so that the shaft passes through the central bore of each friction ring. The friction rings 80 are press fit onto the shaft 60 so that the friction rings do not rotate relative to the shaft. The fingers 82 of the friction rings extend radially outwardly so that the tips of the fingers frictionally engage the inner surface of the roller 40. The fingers 82 frictionally couple the shaft 60 and the roller 40 so that rotation of the roller causes the shaft to rotate, as is discussed further below.

When the conveyor belt 30 is in motion in the forward direction, the roller 40 rotates in a forward direction as indicated in FIG. 6A. The flexible fingers of the friction rings 80 engage the inner surface of the roller 40 causing drag between the roller 40 and the shaft 60. The shaft 60 is restricted from rotating in response to the drag because the reversing pin 64 is resting against the end of the elongated slot 68 in the reversing plate 66. However, if the direction of the conveyor belt 30 is reversed, as shown in FIG. 6B, the flexible fingers of the elastomeric sleeve 80 resist the change in rotation. The fingers flex in the reverse direction and rub the inside of the roller 40 causing drag in the reverse direction between the roller and the elastomeric rings. The reverse frictional drag causes the shaft 60 to rotate in the reverse direction until the reversing pin 64 comes in contact with the opposite end of the elongated slot 68 in the reversing plate 66. Once the reversing pin engages the opposite end of the slot 68, the shaft is constrained against further reverse rotation in response to the drag of the friction rings.

As desired above, the friction rings 80 provide an automatic reversing mechanism for reversing. Alternatively or additionally, a manual reversing mechanism may be utilized. Specifically, it may be desirable to include a handle fixedly or removably attached to the house. The handle is operable by the user to manually rotate the shaft 60 between the first position, illustrated in FIG. 6A and the second position 6B. The handle can be utilized in place of or in addition to the friction rings 80.

With the foregoing description in mind, the conveyor belt trainer 10 operates as follows. The conveyor belt 30 conveys material on the forward run, and passes under the trainer 10 on the reverse run. When the conveyor belt 30 is properly trained, the force of the conveyor belt against the trainer 10 is balanced about the pivot axis of the trainer so that the trainer is generally horizontally disposed. If the conveyor belt becomes misaligned toward the right side, for instance, the force on the belt against the trainer is greater on the right side of the trainer pivot axis. The greater force on the right side of the trainer causes the right end of the trainer to pivot upwardly and forward and the left end of the trainer to pivot downwardly and backward. The conveyor belt 30 then travels down the roller 40 toward the left side, realigning itself. As the conveyor belt 30 travels up the roller, the roller 40 pivots and returns to its original horizontal position when the belt is realigned. Similarly, when the belt becomes misaligned to the left, the left end of the trainer pivots upwardly and forward and the belt travels down the trainer toward the right side to realign the belt. When the conveyor is reversed, the pivot axis is rotated so that the trainer continues to align the belt in the reverse direction.

It will be recognized by those skilled in the art that changes or modifications may be made to the above-described embodiments without departing from the broad inventive concept of the invention. It should therefore be understood that this invention is not limited to the particular embodiments described herein but is intended to include all changes and modifications that are within the scope and spirit of the invention as set forth in the following claims.

That which is claimed is:

1. An alignment device for aligning a conveyor belt that is operable in a forward direction and a reverse direction, comprising:

a shaft having a longitudinal axis, the shaft being rotatable about the longitudinal axis between a first position and a second position;

a training roller substantially the width of the conveyor belt in operable engagement with the conveyor belt, the roller being pivotable about a pivot axis transverse the longitudinal axis of the shaft;

a coupler comprising a plurality of resilient fingers for transferring a driving force from the roller to the shaft; and a bearing assembly disposed between the shaft and the roller, the bearing assembly being pivotable about the pivot axis along with the roller;

wherein when the direction of the conveyor is reversed between the forward and reverse directions, the coupler conveys a driving force to the shaft, rotating the shaft between the first and second positions, thereby rotating the pivot axis.

2. The device of claim 1 wherein the roller is disposed across the width of the conveyor belt, transverse the direction of travel of the conveyor belt.

3. The device of claim 1 wherein the longitudinal axis of the shaft is generally parallel to the plane of the direction of travel of the conveyor belt.

4. The device to claim 1 wherein the roller includes an elastomeric coating.

5. The device of claim 1 wherein the conveyor belt has an outer surface for conveying material and an inner surface, wherein the roller confronts the inner surface of the belt.

6. The device of claim 5 wherein the roller engages the inner surface of the belt.

7. The device of claim 6 wherein the conveyor belt is tensioned into engagement with the roller.

8. The device of claim 1 wherein the belt has an upper run and a lower run, the lower run passing over and being supported by a belt support, wherein the training roller is disposed above the lower run of the belt, in operable engagement with the lower run of the belt.

9. The device of claim 1 wherein the ends of the roller flare outwardly forming frustoconically-shaped ends.

10. A method for aligning a conveyor belt operable in a forward direction and a reverse direction, comprising the steps of:
   conveying a conveyor belt in a forward direction along a conveyor path;
   depositing material on the belt;
   aligning the conveyor belt with the conveyor path as the conveyor belt travels in the forward direction;
   discharging the deposited material from the belt;
   reversing the direction of the conveyor belt so that the conveyor belt travels in a reverse direction;
   aligning the conveyor belt with the conveyor path as the conveyor belt travels in the reverse direction; and
   providing a training device for aligning the conveyor belt, the training device being pivotable about a pivot axis, wherein reversing the conveyor belt from the forward direction to the reverse direction rotates the pivot axis from a first angle with respect to the conveyor belt to a second angle with respect to the conveyor belt.

11. The method of claim 10 comprising the step of tensioning the belt into engagement with the training device.

12. An alignment device for aligning a conveyor belt that is operable in a forward direction and a reverse direction, comprising:
   a shaft having a longitudinal axis, the shaft being rotatable about the longitudinal axis between a first position and a second position;
   a training roller in operable engagement with the conveyor belt, the roller being pivotable about an axis transverse the longitudinal axis of the shaft;
   wherein rotating the shaft from the first position to the second position rotates the pivot axis; and
   a driving mechanism engaging the shaft and the roller, the driving mechanism being operable to rotate the shaft from the first position to the second position.

13. The device of claim 12 wherein the roller is disposed across the width of the conveyor belt, transverse the direction of travel of the conveyor belt.

14. The device of claim 12 wherein the longitudinal axis of the shaft is substantially parallel to the plane of the direction of travel of the conveyor belt.

15. The device of claim 12 wherein the roller includes an elastomeric coating.

16. The device of claim 12 comprising a bearing assembly disposed between the shaft and the roller, the bearing assembly being pivotable about the pivot axis along with the roller.

17. The device of claim 12 wherein the driving mechanism provides a frictional engagement between the shaft and the roller.

18. The device of claim 12 wherein the conveyor belt has an outer surface for conveying material and an inner surface, wherein the roller confronts the inner surface of the belt.

19. The device of claim 18 wherein the roller engages the inner surface of the belt.

20. The device of claim 19 wherein the conveyor belt is tensioned into engagement with the roller.

21. The device of claim 12 wherein the belt has an upper run and a lower run, the lower run passing over and being supported by a belt support, wherein the training roller is disposed above the lower run of the belt, in operable engagement with the lower run of the belt.

22. The device of claim 12 wherein the ends of the roller flare outwardly forming frustoconically-shaped ends.

23. A conveyor system comprising:
   an endless conveyor belt for receiving and conveying material;
   a conveyor driving mechanism operable in a forward direction and a reverse direction to drive the conveyor belt in forward and reverse directions;
   a plurality of supports for supporting the conveyor; and
   a training device for aligning the conveyor belt as the belt travels in the forward and reverse directions, wherein the training device pivots about a pivot axis in response to misalignment of the belt, and changing the direction of travel of the belt rotates the pivot axis from a first angle with respect to the belt to a second angle with respect to the belt.

24. The device of claim 23 wherein the conveyor belt has an outer surface for conveying material and an inner surface, wherein the training device engages the inner surface of the belt.

25. The device of claim 24 wherein the conveyor belt is tensioned into engagement with the training device.

26. The device of claim 23 wherein the conveyor belt has an upper run and a lower run, the lower run passing over one of the conveyor supports, wherein the training device is disposed above the lower run of the belt, and is in operable engagement with the lower run of the belt.

* * * * *